April 14, 1959 B. T. HENSGEN 2,881,573
BAG SEALING MACHINE AND METHOD
Filed Jan. 26, 1954 2 Sheets-Sheet 1

INVENTOR.
BERNARD T. HENSGEN
BY R. L. Story
ATTORNEY

April 14, 1959 B. T. HENSGEN 2,881,573
BAG SEALING MACHINE AND METHOD
Filed Jan. 26, 1954 2 Sheets-Sheet 2
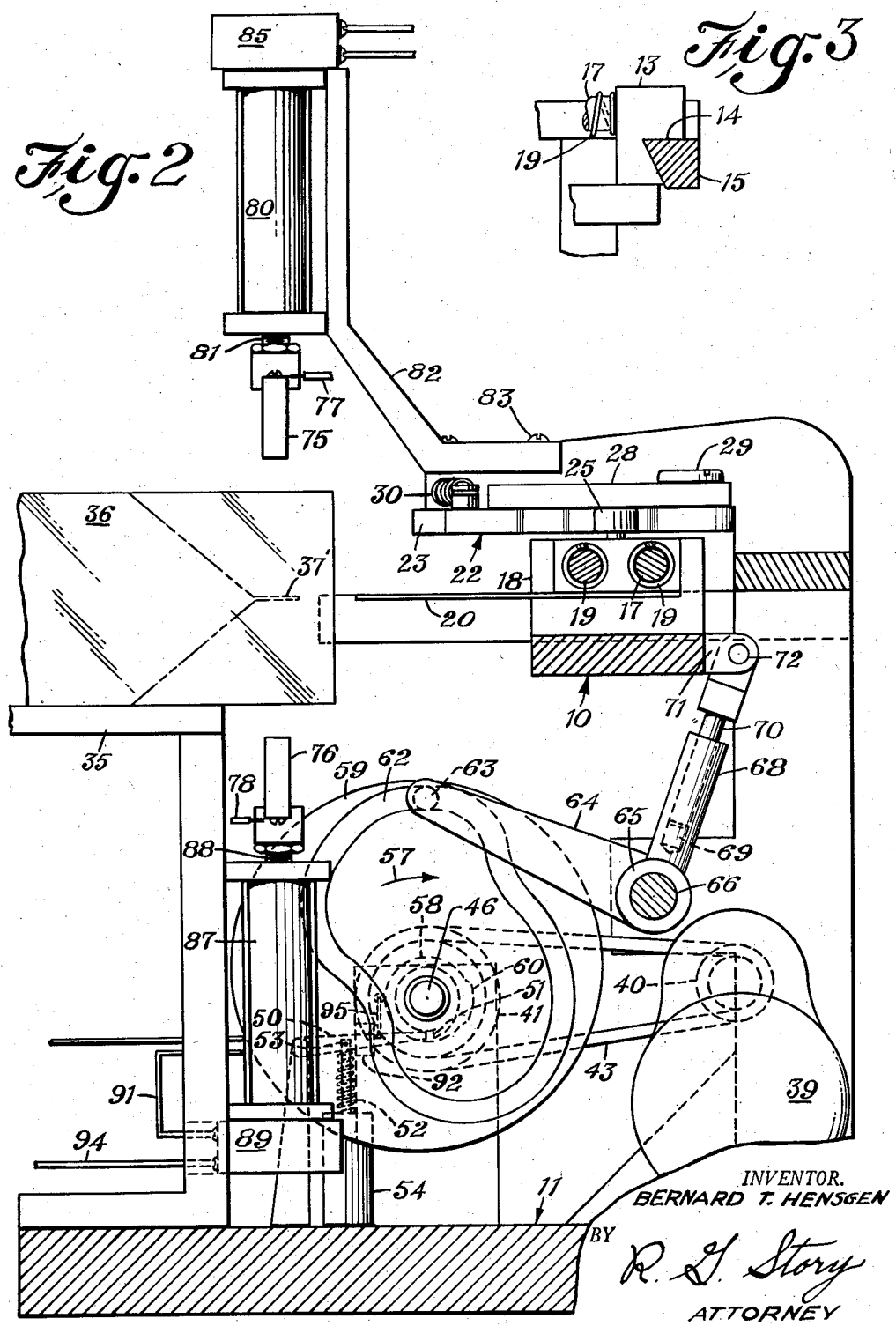
INVENTOR.
BERNARD T. HENSGEN
BY
R. G. Story
ATTORNEY

2,881,573
BAG SEALING MACHINE AND METHOD

Bernard T. Hensgen, Chicago, Ill., assignor to Swift & Company, Chicago, Ill., a corporation of Illinois Application January 26, 1954, Serial No. 406,304

11 Claims. (Cl. 53—22)

The present invention relates to a method and apparatus for use in the closing of ends of tubes.

Many products sold today are enclosed in sealed packages formed of transparent films such as cellophane or a rubber hydrochloride film of the type sold under the trademark "Pliofilm." The packages may be in the form of a tube with both ends open which requires the sealing of both ends, or a tube with one end already sealed to leave it in the form of a sack. In some instances the tube may be formed by wrapping a sheet of material about the product with the overlapping sides being attached to each other to form the tube. In any event the unclosed ends must be sealed after the product is inserted therein.

The sealing is done in one of a number of ways depending upon the circumstances involved. In some instances the film may have a pressure sensitive adhesive on the inner wall so that the two sides can be adhered to form a seal. In other instances heat, together with pressure, is employed as by means of a hot iron or dielectrically heating the film between a pair of conductors. No matter what may be the method of sealing and the means employed it usually is important to have the two sides smoothed out flat in relation to each other in order to obtain a tight seal without imperfections therein. For example, in the case of heat sealing with a hot iron or with dielectric heating, if there are wrinkles in the film there will not be a uniform heating of the film entirely across the two sides to be joined, with the result that imperfect seals will be encountered. The principal object of the present invention is to provide a method and apparatus for sealing the ends of tubes of film without having wrinkles across the film which might result in imperfect seals.

A further object of the invention is to provide a method and apparatus for sealing the ends of tubes wherein the majority of the end is closed and the remainder of the end is held in a fixed position for facilitating the further sealing of that end when it is desired. This greatly facilitates the producing of packages wherein the atmosphere within the package is controlled, as for example by evacuating or by filling with a special gas. The small opening left within the end of the package can be utilized for adjusting the atmosphere within the package before the final sealing. The fact that the final sealing need only cover a small portion of the end of the package, which portion has been fixed in position by the major initial sealing, greatly facilitates the performing of the final sealing within an enclosed chamber wherein the atmosphere is controlled to fix the atmosphere to be sealed within the package.

Another object of the invention is to provide an apparatus that is simple and foolproof in construction and operation. This not only produces a low investment cost but in addition the cost of maintenance, upkeep, etc., is very low.

Other objects and advantages will become apparent from the following description taken in conjunction with the drawings in which:

Figure 2 is a section taken at line 2—2 of Figure 1; and

Figure 3 is a partial section taken at line 3—3 of Figure 1.

Figure 1:
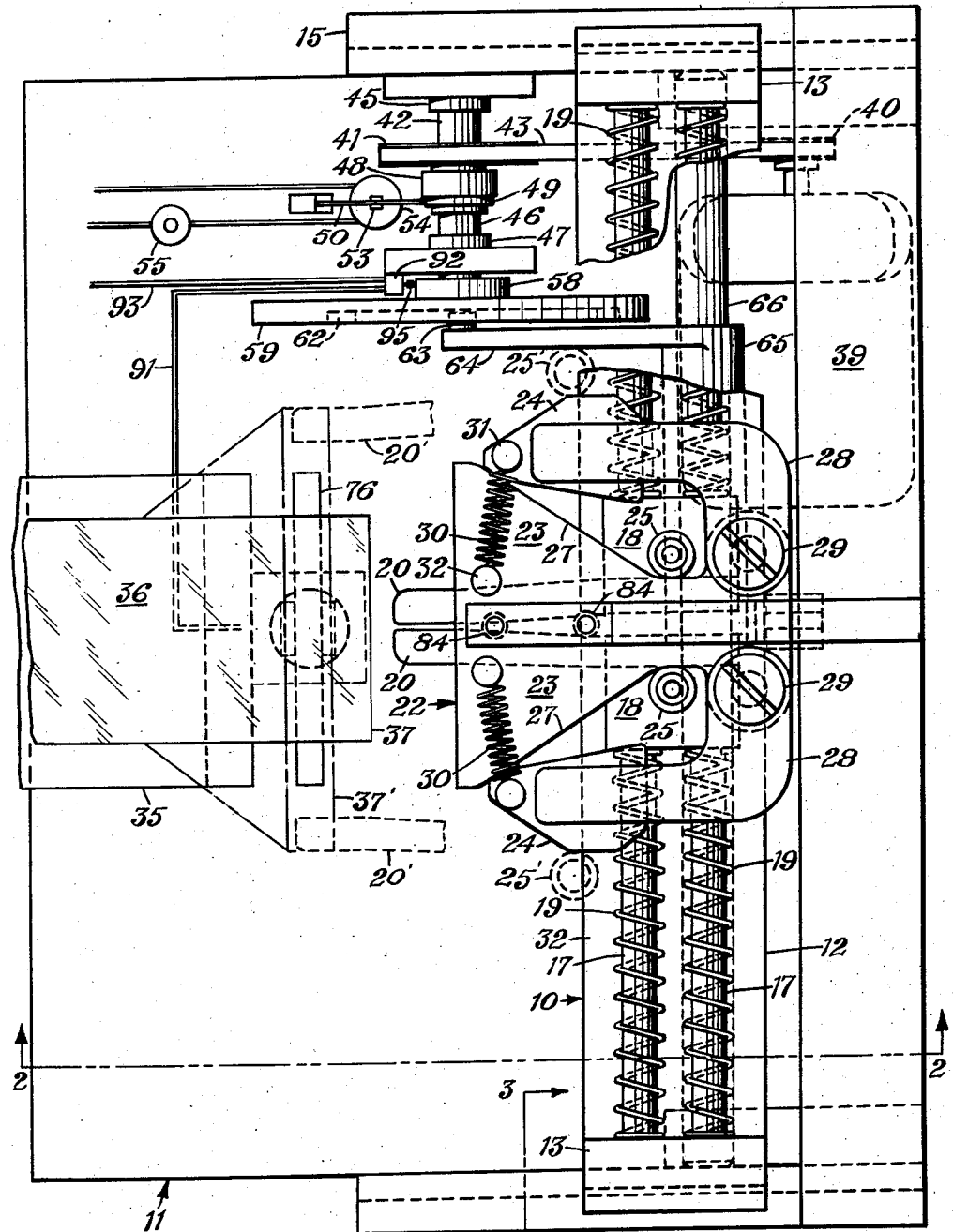
Figure 1 is a plan view of an embodiment of the invention with the upper sealing member and mounting structure therefor removed. In this view other portions of the device are broken away to better illustrate the parts.

The method I have devised for consistently obtaining good seals on the ends of tubes is to first contact the inner walls of the tube at opposite sides of one end of the tube. These walls are then pushed outwardly at the points of contact which draws the adjacent sides of the tubes flat. While holding the tube flat in this manner, pressure either alone or together with heat is applied to the outer walls of the flattened sides to accomplish the sealing. The pressure area may extend only partially between the two sides of the bag where the spreading contact was made or it may extend entirely across the end of the bag immediately adjacent the points at which the spreading contact was made. Preferably the initial points of contact in the inner walls of the tube are spaced some distance inwardly from the end of the tube. Then as the tube is pushed outwardly at these points of contact the points of contact are gradually drawn toward the end of the tube. I have found that this procedure further insures the flattening of the tube and the elimination of wrinkles so that there is less possibility of faulty seals being made at the time the pressure is applied.

The structure illustrated in the disclosed embodiment for accomplishing this method is one wherein the machine does nothing more than seal one end of a tube. A mere duplication of parts is all that is necessary to provide apparatus for sealing both ends of the tube simultaneously. It will be apparent to those skilled in the art that the disclosed embodiment is readily adapted for insertion into a more complicated machine in which additional packaging operations are performed over that of merely sealing the end of a tube.

In the illustrated embodiment a carriage generally 10 is mounted on a frame generally 11. The carriage is formed of a bottom plate 12 having secured to its ends a pair of blocks 13. Each of the blocks 13 has a V groove 14 to fit over a V-shaped way 15 forming a part of frame 11 (Figure 3). Between blocks 13 and above plate 12 are a pair of fixed, parallel, rods 17 which pass through a pair of finger mounting blocks 18. The openings in finger mounting blocks 18 through which rods 17 pass are slightly larger than the rods so that the blocks will move longitudinally with respect to the rods. Springs 19 about each end of each of rods 17 press against end blocks 13 and finger mounting blocks 18 to resiliently urge the finger mounting blocks together at the center of carriage 10. Attached to each of finger mounting blocks 18 is a finger 20, with the two fingers projecting forwardly from the blocks 18 and being held in a common plane by the mounting of the blocks 18 on rods 17.

Immediately above finger mounting blocks 18 is a cam means generally 22 which comprises a pair of fixed cams 23 and a pair of movable cams 24. As will be subsequently apparent from the description the movable cams act with respect to the fixed cams to provide a switch so that the movement of the cam followers on the return path is different from the movement of the cam followers on the outgoing path. The fixed cams 23 are secured to frame 11 in alignment with a cam follower 25 secured to each of fingers 20. Fixed cams 23 have a tapering portion 27 to move the cam followers 25 away from each other as the carriage moves to the left in Figure 1. Movable cams 24 are attached to arms 28 with the arms in turn being pivotally secured to the frame end of fixed cams 23 by means of screws 29. Springs 30 between pin 31 on movable cam 24 and pin 32 on fixed cam 23 resiliently urge the movable cams against the fixed cams as illustrated in Figure 1.

Immediately in front of fingers 20 the frame 11 forms a table 35 to hold the tubes 36 with the open end 37 to be sealed facing fingers 20.

The power means to operate the machine includes a gear head motor 39 having a pulley 40 on the slow speed output shaft thereof. Pulley 40 drives a pulley 41 mounted on shaft 42 by means of an interconnecting belt 43. Shaft 42 is supported in a bearing 45 and positioned concentrically with a second shaft 46 mounted in a bearing 47. Both of bearings 45 and 47 are attached to frame 11. A slip clutch 48 interconnects shafts 42 and 46. The output side 49 of clutch 48, i.e. the portion connected to shaft 46, is normally locked against rotation by means of an arm 50 pivotally secured at one end to frame 11, with the other end of the arm being held against a step 51 (Figure 2) in the output side 49 of the clutch. Arm 50 is held in this position by a spring 52 about the armature 53 of a solenoid 54. Solenoid 54 is connected in series with a push button switch 55 and a suitable source of electrical power, not shown, to operate the solenoid.

Spring 52 bears against the top of the solenoid 54 and against the bottom of the arm 50 to urge the arm upwardly into contact with the periphery of the output side 49 of clutch 48 where the unsupported end of arm 50 will contact step 51. Armature 53 is pinned to arm 50. Inasmuch as motor 39 rotates shaft 42 in the direction indicated by arrow 57 in Figure 2, the clutch normally will merely slip because of the output end 49 being locked by arm 50 unless the output end is unlatched by arm 50 being lowered out of contact with step 51.

At the other side of the upstanding portion of frame 11 to which bearing 47 is secured a pair of cams 58 and 59 are attached to shaft 46. Cam 58 is an external cam having a high spot 60 (Figure 2). Cam 59 is a box cam with a groove 62 within which a cam follower 63 rides. Cam follower 63 is attached to one end of an arm 64 of a rocker, the central boss 65 of which is journaled on a shaft 66. The other arm 68 of the rocker has a circular longitudinal opening 69. A pin 70 is slidably received in opening 69 with the other end of the pin being pivotally attached to a projection 71 on carriage 10 by means of a rivet 72.

An upper and a lower pressure member 75 and 76 are employed to perform the sealing operation. The exact structure of these pressure members will vary depending upon how much of the area of the mouth of the bag is to be encompassed by the seal and how the sealing is to be accomplished, whether by pressure sensitive adhesives, hot irons, dielectric heating, etc. In the illustrated embodiment the hot iron method of sealing is utilized and the upper and lower pressure members 75 and 76 have internal electric heating elements, not shown, connected by wires 77 and 78 to a suitable source of electric power to heat the electric elements. Inasmuch as the atmosphere within the package is to be controlled only a portion of the mouth of the tube is covered by the sealing irons leaving openings for adjusting the atmosphere.

The mounting means for the upper pressure member 75 includes a fluid cylinder 80 with the pressure member 75 being attached to the piston rod 81 of the cylinder. Cylinder 80 is secured to a bracket 82 attached to frame 11 by means of screws 83, threaded into openings 84 in frame 11. It should be noted that in Figure 1 screws 83 have been unscrewed and bracket 82 and the structure mounted thereon have been removed. In a manner well-known in the art the operation of cylinder 80 is controlled by an electrically actuated 4-way fluid valve 85. The structure of the mounting means for lower pressure member 76 corresponds to that of the upper pressure member except that cylinder 87 is attached directly to frame 11. Pressure member 76 is attached to piston rod 88. An electrically actuated 4-way fluid valve 89 controls the operation of cylinder 87. Cylinders 80 and 87 are connected to a source of fluid pressure (not shown) through valves 85 and 89.

A wire 91 is connected to electrically actuated 4-way valve 89 and to a snap action switch 92. A wire 93 connected to switch 92 and a wire 94 connected to electrically actuated 4-way valve 89 with each of wires 93 and 94 proceed to one side of a suitable source of power for the operation of valve 89. The connections for electrically actuated 4-way valve 85 are identical to those just described with respect to valve 89 but have not been shown. Switch 92 is attached to frame 11 with its actuating member 95 riding on the periphery of cam 58 so that the switch will be actuated when actuating member 95 is moved by high spot 60 on cam 58.

In operation motor 39 runs continuously. After tube 36 is placed on table 35 with the open end 37 of the tube between the pressure members 75 and 76, as seen in Figures 1 and 2, button 55 is pressed to energize solenoid 54. This draws in the armature 53 of the solenoid to unlatch arm 50 from stop 51. As soon as the clutch is so unlatched, button 55 may be released and clutch 48 will rotate one turn before arm 50, having been urged upwardly by spring 52, again stops the rotation by contact with stop 51.

Box cam 59 draws arm 64 downwardly to move arm 68 and carriage 10 forwardly, to the left in Figure 2. The movement of the carriage causes fingers 20 to enter the open end 37 of the bag with the fingers being gradually moved apart by reason of the contact of the cam followers 25 on the sloping sides 27 of cams 23. As cam followers 25 contact the movable cams 24, springs 30 allow the movable cams to move outwardly with the arms 28 pivoting about bolts 29. When cam followers 25 pass the ends of movable cams 24, springs 30 cause the movable cams to resume the position illustrated in Figure 1. This provides the switch action whereby the cam followers 25 follow a different return path than the path along which they initially traveled.

Upon the closing of the switches, box cam 59 starts rotating the rocker, i.e. arms 64 and 68, in a clockwise direction to commence moving the carriage 10 in the reverse direction. Previous to this reverse movement the fingers 20 had penetrated a substantial distance into the open mouth of the bag and had moved outwardly to contact the inner wall of the bag at two opposite points. During the initial portion of the return movement the cam followers 25 continue to move the fingers outwardly. This outwardly movement along with the return movement of the fingers draws the sides of the mouth of the bag out flat to position them in the plane of the fingers 20.

At the time the cam followers reach the position illustrated at 25' in Figure 1, the fingers 20 have assumed the position illustrated in dotted lines at 20' in Figure 1 and the mouth of the bag has assumed the position illustrated at 37' in Figures 1 and 2. Slot 62 in box cam 59 provides a brief dwell at about this point. Just prior to this point, high spot 60 on cam 58 actuated snap action switch 92 to energize (or deenergize depending upon the internal structure of the particular electrically actuated 4-way valves that are chosen) 4-way valves 85 and 89 so that fluid pressure is applied to the outside ends of the pistons in cylinders 80 and 87 to move piston rods 81 and 88 toward each other.

During the dwell period when the fingers are in the position illustrated at 20' in Figure 1 the pressure members 75 and 76 contact the outer portions of the wall of the tube between the two points at which the fingers are contacting the sides of the bag to hold it taut. The pressure, and heat in the illustrated embodiment, of members 75 and 76 produce a seal across the mouth of the bag in the area covered by the pressure members. High spot 60 on cam 58 passing beyond switch actuating lever 95 returns the switch to the original position to change the position of the 4-way valves 85 and 89 and apply fluid pressure to the inner ends of cylinders 80 and 87. The continued rotation of shaft 46 returns the carriage 10 to the position illustrated in Figures 1 and 2. As cam followers 25 reach the rear side of the movable cams 24 they pass under arms 28 and are urged into the original position by springs 19. The cycle is completed by arm 50 engaging stop 51 to cause the clutch to commence to slip.

The openings left at the ends of the seal may be utilized to draw a vacuum in the package or to insert a special gas therein. The seal already made holds these unsealed ends in position so that they may be sealed simply in a subsequent operation.

The foregoing description of a specific embodiment is for the purpose of compliance with 35 U.S.C. 112, and I do not desire to be limited to the exact details shown and described, for obvious modifications will occur to persons skilled in the art.

I claim:

1. A device for use in the closing of tubes, said device including a frame, a carriage, a pair of fingers mounted on said carriage in a given plane, at least one of said fingers being movable with respect to the other of the fingers, said carriage being movably mounted on said frame to permit said fingers to be moved in said plane in a direction generally longitudinal of said fingers, means to position said fingers in a side by side position when said carriage is in a first position whereby the fingers will be positioned to enter the end of a tube held in front of the ends of the fingers, cam means operatively connected to said fingers to pivot said fingers apart when said carriage is moved in the direction of said tube to a second position and to continue to pivot said fingers apart during the initial period of the return movement of the carriage from the second to the first position, power means operatively-connected to said carriage to move said carriage from said first to said second position and return whereby the fingers will enter the end of said tube and will draw the sides of the tube substantially flat, tube sealing means, and means to move the tube sealing means against the flattened sides of the tube after the fingers have been moved fully apart.

2. A device for use in the closing of tubes, said device including a frame, a carriage, a pair of fingers pivotally mounted on said carriage in a given plane, at least one of said fingers being movable with respect to the other of the fingers, said carriage being movably mounted on said frame to permit said fingers to be moved in said plane in a direction generally longitudinal of said fingers, means to position said fingers in a side by side position when said carriage is in a first position whereby the fingers will be positioned to enter the end of a tube held in front of the ends of the fingers, a cam mounted on said frame, cam followers on said fingers, resilient means urging said cam followers against said cam, the configuration of said cam being such to spread said fingers as said carriage moves in the direction of said tube to a second position, said cam including a switch to provide a different return path for the cam followers than the path of the followers when the carriage moves from the first to the second position, the configuration of said cam being such that the fingers will continue to move apart during the travel of the followers along the initial portion of said return path, power means operatively connected to said carriage to move said carriage from said first to said second position whereby the fingers will enter the end of said tube and will draw the sides of the tube substantially flat, tube sealing means, and means to move the tube sealing means against the flattened sides of the tube.

3. The method of closing the ends of a tube including the steps of contacting the inner walls of the tube at opposite sides of the tube inwardly from one end of the tube, pushing the walls outwardly at the points of contact to draw the adjacent sides of the tube flat while at the same time moving the points of contact toward said end of the tube, and sealing said adjacent sides of said tube to each other in the space between the points of contact while maintaining said contact.

4. A device for use in the closing of tubes, said device including a pair of fingers, means to insert the ends of the fingers a substantial distance into an end of the tube, to gradually withdraw the fingers and to progressively spread the fingers apart during at least part of said withdrawal with the fingers being sufficiently apart when the ends of the fingers are again adjacent the end of the tube to draw the sides of the tube flat, tube sealing means of a shorter length than the width of the flattened tube, and means to move the tube sealing means against the substantially flattened sides of the tube between the fingers when the ends of the fingers are again adjacent the end of the tube before the fingers are completely removed from the tube.

5. A device for use in the closing of tubes, said device including a frame, a carriage, a pair of fingers pivotally mounted on said carriage in a given plane, at least one of said fingers being movable with respect to the other of the fingers, said carriage being movably mounted on said frame to permit said fingers to be moved in said plane in a direction generally longitudinal of said fingers, means to position said fingers in a side by side position when said carriage is in a first position whereby the fingers will be positioned to enter the end of a tube held in front of the ends of the fingers, a cam mounted on said frame, cam followers on said fingers, resilient means urging said cam followers against said cam, the configuration of said cam being such to spread said fingers as said carriage moves in the direction of said tube to a second position, said cam including a switch to provide a different return path for the cam followers than the path of the followers when the carriage moves from the first to the second position, the configuration of said cam being such that the fingers will continue to move apart during the travel of the followers along the initial portion of said return path and will have a dwell before returning to their side by side position at the first position of the carriage, power means operatively connected to said carriage to move said carriage from said first to said second position whereby the fingers will enter the end of said tube and will draw the sides of the tube substantially flat, tube sealing means, and means to move the tube sealing means against the flattened sides of the tube when the cam followers are in said dwell.

6. A device for use in the closing of tubes, said device including a frame, a carriage, a pair of fingers mounted on said carriage in a given plane, at least one of said fingers being movable with respect to the other of the fingers, said carriage being movably mounted on said frame to permit said fingers to be moved in said plane in a direction generally longitudinal of said fingers, means to position said fingers in a side by side position when said carriage is in a first position whereby the fingers will be positioned to enter the end of a tube held in front of the ends of the fingers, cam means operatively connected to said fingers to pivot said fingers apart when said carriage is moved in the direction of said tube to a second position and to continue to pivot said fingers apart during the initial period of the return movement of the carriage from the second to the first position, and power means operatively-connected to said carriage to move said carriage from said first to said second position and return whereby the fingers will enter the end of said tube and will draw the sides of the tube substantially flat during the return movement of the fingers.

7. A device for use in the closing of tubes, said device including a frame, a carriage, a pair of fingers pivotally mounted on said carriage in a given plane, at least one of said fingers being movable with respect to the other of the fingers, said carriage being movably mounted on said frame to permit said fingers to be moved in said plane in a direction generally longitudinal of said fingers, means to position said fingers in a side by side position when said carriage is in a first position whereby the fingers will be positioned to enter the end of a tube held in front of the ends of the fingers, a cam mounted on said frame, cam followers on said fingers, resilient means urging said cam followers against said cam, the configuration of said cam being such to spread said fingers as said carriage moves in the direction of said tube to a second position, said cam including a switch to provide a different return path for the cam followers than the path of the followers when the carriage moves from the first to the second position, the configuration of said cam being such that the fingers will continue to move apart during the travel of the followers along the initial portion of said return path, and power means operatively connected to said carriage to move said carriage from said first to said second position whereby the fingers will enter the end of said tube and will draw the sides of the tube substantially flat.

8. The method of closing the ends of a tube including the steps of contacting the inner walls of the tube at opposite sides of one end of the tube, thereafter pushing the walls outwardly at the points of contact to draw the adjacent sides of the tube flat, sealing said adjacent sides of said tube to each other only in the area between the points of contact while maintaining said contact whereby the portions of the tube at the points of contact are unsealed, adjusting the atmospheric conditions within the partially sealed tube and removing the contact in the area adjacent the seal, and sealing said unsealed portions of said tube.

9. The method of closing the ends of a tube containing product, said method including the steps of contacting the inner walls of the tube at opposite sides of the tube between said product and the end of the tube, thereafter pushing the walls outwardly at the points of contact to draw the adjacent sides of the tube flat, sealing a substantial portion of said adjacent sides between the points of contact and no closer to said product than said points of contact, removing said contact, and subsequently sealing the remainder of the width of said tube between said sealed portion and the edges adjacent where the points of contact had been.

10. The method of closing the ends of a tube of heat sealable material containing product, said method including the steps of contacting the inner walls of the tube at opposite sides of the tube between said product and the end of the tube, thereafter pushing the walls outwardly at the points of contact to draw the adjacent sides of the tube flat, applying heat and external pressure to a substantial portion of said adjacent sides between the points of contact and no closer to said product than said points of contact, removing said contact, and subsequently sealing the remainder of the width of said tube between said sealed portion and the edges adjacent where the points of contact had been.

11. The method of closing the ends of a tube containing product, said method including the steps of contacting the inner walls of the tube at opposite sides of the tube between said product and the end of the tube, thereafter pushing the walls outwardly at the points of contact while moving the points of contact toward the end of the tube to draw the adjacent sides of the tube flat, sealing a substantial portion of said adjacent sides between the points of contact and no closer to said product than said points of contact, removing said contact, and subsequently sealing the remainder of the width of said tube between said sealed portion and the edges adjacent where the points of contact had been.

References Cited in the file of this patent

UNITED STATES PATENTS

| 1,625,720 | Gangler | Apr. 19, 1927 |
| 2,277,289 | Bergstein | Mar. 24, 1942 |
| 2,415,978 | Vergobbi | Feb. 18, 1947 |